United States Patent
Lang et al.

(10) Patent No.: US 7,237,120 B1
(45) Date of Patent: Jun. 26, 2007

(54) METHOD FOR PRODUCING AND CHECKING FORGE-PROOF DOCUMENTS

(75) Inventors: Jürgen Lang, Bergisch Gladbach (DE); Bernd Meyer, Königswinter (DE)

(73) Assignee: Deutsche Post AG (DE)

( * ) Notice: Subject to any disclaimer, the term of this patent is extended or adjusted under 35 U.S.C. 154(b) by 848 days.

(21) Appl. No.: 10/089,858

(22) PCT Filed: Oct. 5, 2000

(86) PCT No.: PCT/DE00/03507

§ 371 (c)(1),
(2), (4) Date: Aug. 28, 2002

(87) PCT Pub. No.: WO01/25880

PCT Pub. Date: Apr. 12, 2001

(30) Foreign Application Priority Data

Oct. 7, 1999 (DE) ............................... 199 48 319
Apr. 27, 2000 (DE) ............................... 100 20 563

(51) Int. Cl.
*H04L 9/00* (2006.01)
(52) U.S. Cl. .................................................. 713/187
(58) Field of Classification Search ............ 726/2, 726/22; 713/187, 188; 705/51; 380/201
See application file for complete search history.

(56) References Cited

U.S. PATENT DOCUMENTS 5,606,609 A * 2/1997 Houser et al. ............... 713/179

(Continued)

FOREIGN PATENT DOCUMENTS

DE 195 13 896 9/1976

(Continued)

OTHER PUBLICATIONS

Akl, S. G., et al, "Digital Signatures:A Tutorial Survey," *IEEE Computer Society 16*:15-24, XP-000946230 Feb. 1983.

(Continued)

*Primary Examiner*—Gilberto Barrón, Jr.
*Assistant Examiner*—Thomas Ho
(74) *Attorney, Agent, or Firm*—Connolly Bove Lodge & Hutz

(57) ABSTRACT

The invention relates to a method for producing forgery-proof documents using a security module, whereby the security module generates a temporary secret which remains unknown to a document producer, whereby the temporary secret, together with information that reveals details about the identity of the security module, is transferred in encrypted form to an authentication unit, whereby an authentication unit decrypts the temporary secret, recognizes the identity of the security module and encrypts the temporary secret, together with additional information, in such a way that only a checking unit can carry out a decryption and then the authentication unit transmits the encrypted temporary secret and the additional information to the document producer, whereby the document producer transfers its own data, which has been introduced into the document, to the security module, whereby the security module irreversibly links the temporary secret with the data that the document producer itself has introduced, in such a way that only when the same data is linked again in the same manner can an identical result be obtained, and whereby it is not possible to draw conclusions about the temporary secret. The method according to the invention is characterized in that the result of the irreversible linking of the temporary secret with the data introduced by the document producer is incorporated into the document. The invention also relates to a method for checking the authenticity of a given document.

6 Claims, 2 Drawing Sheets

U.S. PATENT DOCUMENTS

Figure 1:
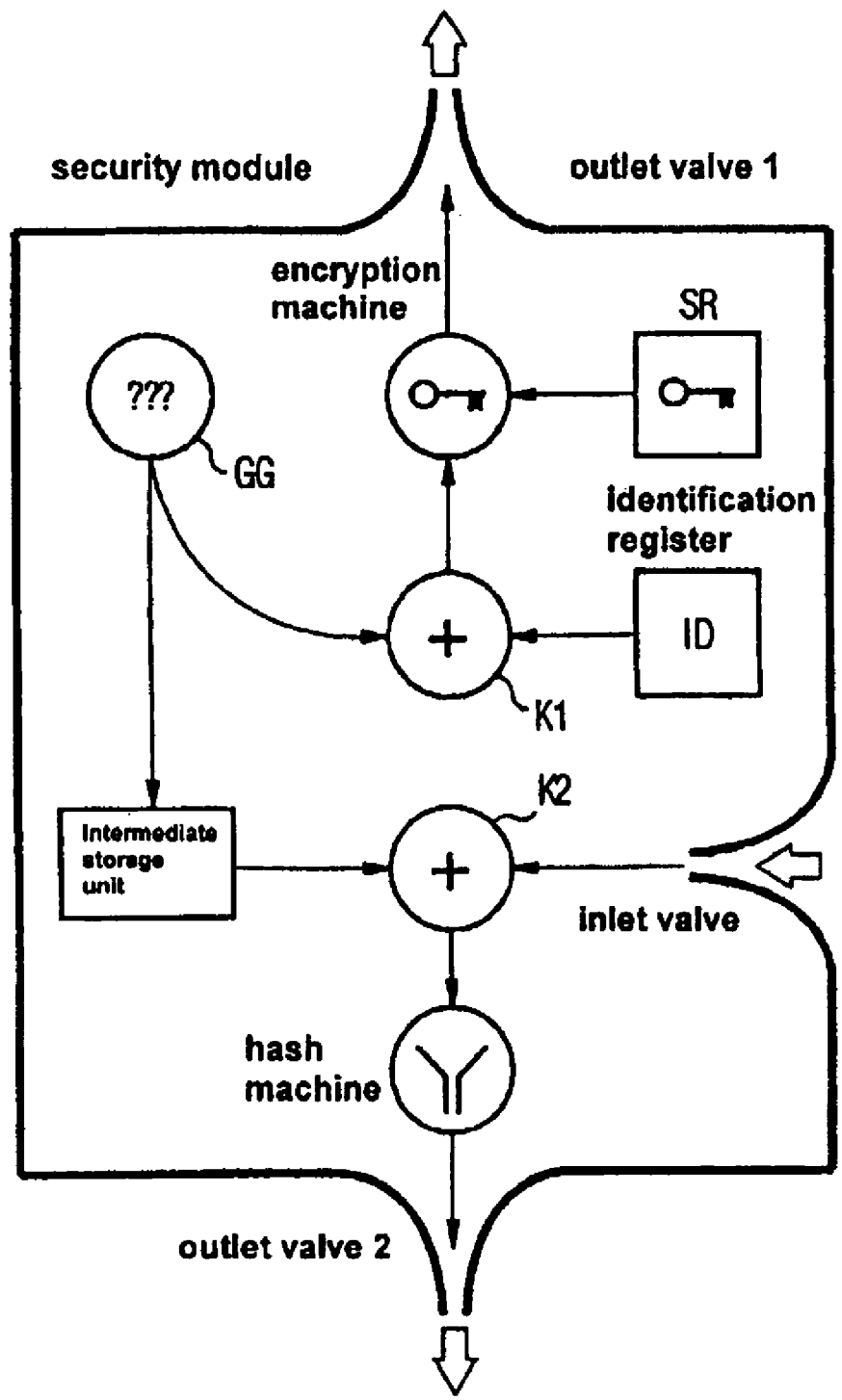

| | | | | |
|---|---|---|---|---|
| 5,859,911 | A | * | 1/1999 | Angelo et al. ............... 713/187 |
| 5,872,848 | A | | 2/1999 | Romney et al. ............... 380/25 |
| 5,937,159 | A | * | 8/1999 | Meyers et al. ................ 726/20 |
| 5,982,506 | A | * | 11/1999 | Kara ........................... 358/405 |
| 6,023,296 | A | * | 2/2000 | Lee et al. ................ 375/240.5 |

FOREIGN PATENT DOCUMENTS

| | | |
|---|---|---|
| DE | 197 03 929 | 8/1998 |
| EP | 0331352 | 9/1989 |
| EP | 0887997 | 12/1998 |
| WO | 98-34373 | 8/1998 |

OTHER PUBLICATIONS

Huhnlein, D., et al, "Secure and cost efficient electronic Stamps," *Secure Networking-Core-Secure '99*, PROCEEDINGS (Lecture Notes in Computer Science vol. 1740), XP 002185463 Dec. 1999.

* cited by examiner

METHOD FOR PRODUCING AND CHECKING FORGE-PROOF DOCUMENTS

The invention relates to a method for producing forgery-proof documents using a security module, whereby the security module generates a temporary secret which remains unknown to a document producer, whereby the temporary secret, together with information that reveals details about the identity of the security module, is transferred in encrypted form to an authentication unit, whereby an authentication unit decrypts the temporary secret, recognizes the identity of the security module and encrypts the temporary secret, together with additional information, in such a way that only a checking unit can carry out a decryption and then the authentication unit transmits the encrypted temporary secret and the additional information to the document producer, whereby the document producer transfers its own data, which has been introduced into the document, to the security module, whereby the security module irreversibly links the temporary secret with the data that the document producer itself has introduced, in such a way that only when the same data is linked again in the same manner can an identical result be obtained, and whereby it is not possible to draw conclusions about the temporary secret.

The invention also relates to a method for checking the authenticity of a given document.

This method and this system, which pertain to the operating principle of a security module in the realm of the digital signature and of the use of encryption techniques, involve three entities in addition to the security module:
- the producer/processor of a document, hereinafter referred to as "document producer",
- an authentication unit that can identify the security module and link it to the identity of the document producer and
- a checking unit where the integrity of the document and the identity of the document producer are checked.

Systems for digital signature such as, for example, the public key signature method according to patent specifications DE 195 13 896 A1 or DE 197 03 929 A1, are known for ensuring that documents are forgery-proof and for identifying document producers.

A digital signature is a seal that relates to digital data and that is generated with a private signature key, whereby said seal—by means of an appertaining public key that is provided with a signature key certificate—makes it possible to verify the owner of the signature key and the integrity of the data (see Article 2, Clause 1 of SigG—German Signature Law). According to the terminology employed here, a checking unit is capable of checking the digital signature of a document producer and thus its identity as well as the integrity of the data contained in the document, if it knows the public signature key of the document producer that is provided with a signature key certificate.

Using the method of the digital signature is problematic when either the checking unit does not know the public signature key of the document producer that is provided with a signature key certificate of a certification unit or else when the document producer does not have its own private or public signature key.

The invention is based on the objective of creating a method for producing and/or checking forgery-proof documents that can also be used when the checking unit does not know the public signature key of the document producer and/or when the document producer does not have its own private or public signature key.

According to the invention, this objective is achieved in that the result of the irreversible linking of the temporary secret with the data introduced by the document producer is incorporated into the document.

Another subject matter of the invention is to carry out a method of the type described above in order to check the authenticity of documents in such a way that the checking unit checks whether the result of an irreversible linking of a secret with data introduced by a document producer have been incorporated into the document, in that the checking unit decrypts the secret and additional information that were encrypted by an authentication unit.

Here, it is especially advantageous for the checking unit to irreversibly link the decrypted temporary secret with the data introduced into the document by the document producer, in the same manner as a security module used to produce the forgery-proof document.

In order to increase data security when producing documents, it is advantageous to perform the method for producing the documents in such a way that the additional information transferred by the authentication unit, together with the temporary secret, is transmitted in encrypted form to the document producer.

Here, it is especially advantageous for the additional information transferred by the authentication unit, which is transmitted to the document producer, together with the temporary secret, to be transmitted in such a way that only a checking unit can carry out a decryption.

Advantageously, the method is performed in such a way that the additional information transferred by the authentication unit contains details on the identity of the document producer and on the validity of the documents generated by the document producer.

In order to check whether the documents were generated by means of the method described above by the document producer who is authorized to do so, it is advantageous to carry out the method to check the authenticity of the document in such a way that the checking unit compares the result of the irreversible linking that it has performed itself with the result of an irreversible linking that was performed by the document producer and incorporated into the document.

Here, it is advantageous that the comparison determines whether data introduced into the document by the document producer has been forged.

Although the steps of producing and checking are carried out separately from each other, it is especially advantageous to combine them into a total process in which the documents are generated as well as checked according to predefined criteria.

In this context, it is advantageous that there is no direct communication and no shared data storage and data processing between the authentication unit and the checking unit.

Additional advantages, special features and practical refinements of the invention can be gleaned from the subordinate claims and from the following presentation of a preferred embodiment with reference to the drawings.

The drawings show the following:

FIG. 1—a security module that can be used in the method and

Figure 2:
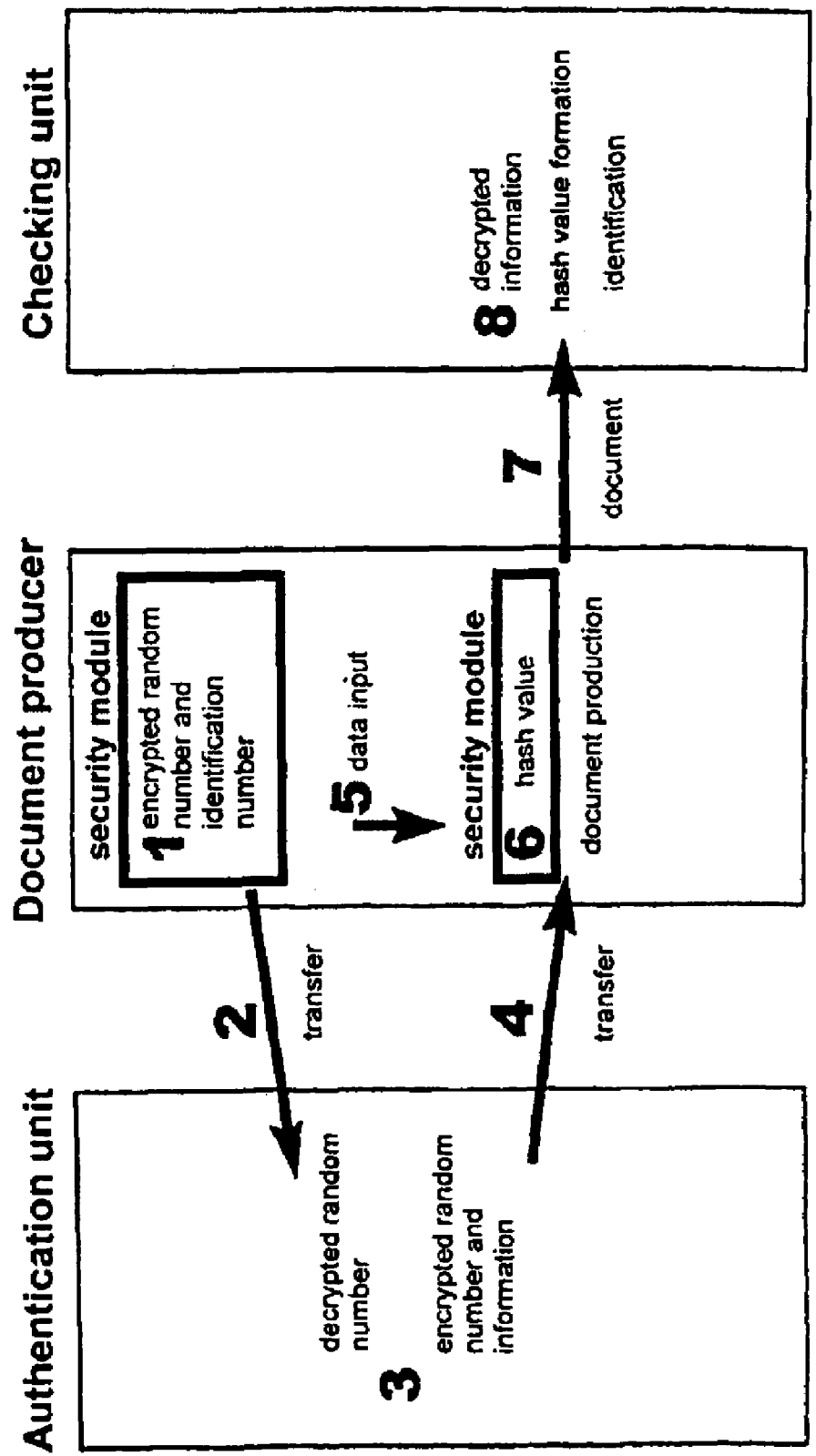

FIG. 2—a schematic representation of a system for generating and checking forgery-proof documents.

With the method and system described here, a checking unit to which both the document producer and the document it has produced are not known has the possibility to reliably check the integrity of the data contained in the document as well as the identity of the document producer, even without the use of a digital signature.

For this purpose, the document producer uses a security module that is realized by using various technical means, preferably involving the interaction of software with programmable hardware, and comprising five active units and three passive units as well as two data output ports and one data input port (see FIG. 1).

The active units are:
a secret generator that generates an unpredictable temporary secret (random number),
an encryption machine that uses a known method to encrypt an input value with a key stored in a register,
a hash machine that, on the basis of an input value, uses a known method to form a hash value of this input value (see Article 17, Clause 2 of SigV—German Signature Regulations) and
two combination machines, each of which combines a result value on the basis of two input values.

The passive units are:
a key register in which a key is stored, with which the encryptions can be generated which can only by decrypted by the confirmation unit,
an identification register containing data with which the security module can unambiguously identify itself at an confirmation unit and
an intermediate memory unit in which the secret generated in the secret generator is temporarily stored.

The data input ports and the data output ports are the only direction-specific input and output possibilities for the security module. Neither the document producer nor third parties can gain any other type of entry or access to the security module. Specifically, the data input ports and data output ports are the following:
a data output port 1 via which the data is output that is transferred to the authentication unit,
a data output port 2 via which the data is output that is incorporated into the document and
a data input port via which the information can be input into the security module by the document producer.

Preferably, the security module described below is used in the method to produce forgery-proof documents.

In the security module, a secret generator creates an unpredictable secret (for example, a random number) that remains unknown outside of the security module and it transfers this secret to the combination machine 1 on the one hand and to the intermediate memory unit on the other hand. The combination machine 1 combines the secret with the data contained in the identification register that unambiguously identifies the security module at a confirmation unit. The result value of the combination machine is input into the encryption machine which uses the key from the key register to generate an encrypted result value that can only be decrypted by the authentication unit. This result value is output from the security module via the data output port 1 in order to be transferred to the authentication unit.

When the authentication unit decrypts the result value that has been output and transferred from the data output port 1, said authentication unit breaks down this result value into the secret and into the data from the identification register, then identifies the security module on the basis of the data from the identification register and the secret and additional information with a key that can only be decrypted by the checking unit, then the encrypted secret and additional information can be transferred to the document producer, who then incorporates them into the document and they can subsequently be decrypted by the checking unit.

Data that the document producer itself introduces via the data input port into the security module is combined by the combination machine 2 with the secret that is stored in the intermediate memory unit. The result value of the combination machine 2 is input into the hash machine that uses a known method to form a hash value of the input value.

This result value is output from the security module via the data output port 2 in order to be incorporated into the document.

Preferably, the following is incorporated into the document:
the data that the document producer itself has introduced into the security module via the data input port,
the hash value that has been output by the security module via the data output port 2 and
the secret and the additional information encrypted by the authentication unit that can only be decrypted by the checking unit.

A checking unit checks the integrity of the document and the identity of the document producer in that the secret and the additional information encrypted by the authentication unit are decrypted by means of a known method and in that a hash value is formed in the security module on the basis of a combination of the secret and the data introduced by the document producer itself and this hash value is compared to the transmitted hash value. If the comparison of the hash values—analogously to the checking of a digital signature—yields the identity of the generated and transmitted hash values, then the document cannot have been forged.

The authentication unit transmits additional information to the document producer encrypted in such a way that only the checking unit can decrypt it, whereby said information is transferred to the document producer to be incorporated into the forgery-proof document for purposes of information on the identity of the document producer and on the period of validity of the documents generated by the document producer.

A preferred area of application of the invention is that document producers are, for example, persons who use a computer (PC) to themselves print out entrance tickets, plane tickets or vouchers whose integrity can be verified by a checking unit that, for instance, controls access to places associated with these documents. The authentication unit is, for example, the ticket office that issues the entrance tickets with which the document producer communicates electronically via the Internet prior to the printing out of the entrance tickets. The security module is a technical means that is preferably realized by means of the interaction of software with programmable hardware and that is at least temporarily a component of the hardware and software of the PC of the document producer.

The invention can ensure that, for example, even without checking the digital signature of the document producer with all of the consequences this entails (individual public signature key of all document producers to be checked), the checking unit that controls the entrance can verify the integrity of a document that was issued within the sphere of influence of an unreliable document producer via its PC and printer. The security module ensures the integrity of information that was inserted into the document by the document producer without the knowledge of the authentication unit as well as the identifiability of the document producer.

Advantageous effects of this invention can be seen in the fact that companies and organizations—by using security modules—can offer their clients the means to easily print out documents via the Internet whose integrity can be checked reliably. It is especially advantageous here that the document producer can dispense with the use of digital signatures, which is associated with a considerable infrastructural and organizational complexity as well as country-specific legal uncertainty. Moreover, with the method and system described, it is advantageous that the scope of the information within the document that serves for the checking unit to check the document is very small in comparison to a digital signature, where the public signature key of the document, producer provided with a signature key certificate of a certification unit, can constitute a component of the document. It is also advantageous that, in order to check the integrity, there does not have to be any direct communication or shared data storage and processing between the authentication unit and the checking unit. Finally, it is advantageous that the communication between the security module and the authentication unit on the one hand, and between the document production and document checking on the other hand can be fundamentally uncoupled from each other in such a way that several documents can be produced on the basis of one communication between the security module and the authentication unit, into which documents different document-specific data can be input by the document producer.

An advantageous method for producing and checking forgery-proof documents will be described below with reference to FIG. 2.

FIG. 2 shows a system in which information generated by a document producer is transferred to an authentication unit, where it is processed and once again transferred to the document producer. The document producer uses the information transmitted by the authentication unit to produce forgery-proof documents. A procedure preferably separated from the document production is the checking of the forgery-proof documents in a checking unit.

The system presented contains the process steps 1 to 8 described below.

In a first process step 1, a temporary secret is generated in the form of a random number that is encrypted together with an identification number of the security module with the public key of the authentication unit so that the document producer cannot gain access to this temporary secret and it can only be decrypted by the authentication unit.

The process step designated with the reference numeral 2 comprises the transfer of the encrypted random number and the identification number to the authentication unit. It should be pointed out that this transfer can also go via an unsecured route since only the authentication unit is capable of decrypting the information.

In a subsequent process step 3, the authentication unit decrypts the random number and the identification number with the private key of the authentication unit. The random number is encrypted with additional information on the identity of the document producer and on the period of validity of the documents produced by the document producer in such a way that only the checking unit can decrypt the random number and the additional information.

In the process step designated with the reference numeral 4, the encrypted information is transferred to the document producer. It should be pointed out that this transfer can also go via an unsecured route since only the checking unit is capable of decrypting the information.

For this reason, the method is especially well-suited for use in data networks that can hardly or not at all be secured against unauthorized access such as, for example, the Internet.

In the process step designated with the reference numeral 5, the document producer enters its own data into the security module, whereby said data serves to identify the document.

In the process step designated with the reference numeral 6, a hash value is formed from the combination of the data input by the document producer and the still-stored random number. The subsequently produced document contains the data that the document producer itself introduces into the document, the just-formed hash value as well as the encrypted information of the authentication unit.

A further process step 7 involves the transfer of the document consisting of the data of the user, the hash value and the encrypted information of the authentication unit (see item 3).

In a checking unit, a process step designated with the reference numeral 8 entails a decryption of the information of the authentication unit using the key of the checking unit. According to Claim 1, the decrypted random number can be used, together with the data that the document producer itself has introduced into the document, to form a hash value and this is done by means of the same, generally known method that was used in the security module to form the hash value. A comparison of the formed hash value with the transferred hash value provides reliable information as to whether the data introduced by the document producer itself was forged. According to Claim 2, additional information on the identity of the document producer and on the period of validity of the documents generated by the document producer can be decrypted here.

Through the method and the system for producing forgery-proof documents using a security module, a checking unit to which both the document producer and the document it has produced are not known has the possibility to reliably check the integrity of the data contained in the document as well as the identity of the document producer, even without the use of a digital signature. All of the checking information needed for this purpose, which has to be incorporated into the document, is made available to an authentication unit with which the security module used for the production of the document communicates prior to producing/processing the document. The method and the system are especially well-suited to give people the possibility to use their own PCs to print out, for example, entrance tickets or vouchers that can be reliably checked for their integrity.

The invention claimed is:

1. A method for producing forgery-proof documents or data records using a security module,
   whereby the security module generates a secret which remains unknown to a document producer and the document producer can not gain access to the secret which can only be encrypted by an authentication unit,
   whereby the secret, together with information that reveals details about the identity of the security module is transferred in encrypted form to an authentication unit,
   whereby the authentication unit decrypts the secret, recognizes the identity of the security module and encrypts the secret, together with information on the identity of the document producer, in such a way that only a checking unit can carry out a decryption and then the authentication unit transmits these to the document producer,
   whereby the document producer transfers its own data to the security module,
   whereby the security module irreversibly links by hash encryption the secret with the data that the document producer itself has introduced, and whereby it is not possible to draw conclusions about the secret, characterized in that the output value of a double combination machine is used to form an irreversible hash and that hash value is output from the outlet valve, the double combination machine comprising a first combination machine and a second combination machine each of which combines a result value on the basis of two input values, the result of the irreversible linking of the secret with the data introduced by the document producer, the data introduced by the document producer itself as well as the encrypted information of the authentication unit all serve to form the document that is transmitted to the checking unit.

2. The method according to claim 1, characterized in that the additional information transferred by the authentication unit contains details on the identity of the document producer and on the period of validity of the documents generated by the document producer.

3. The method for checking the authenticity of a document, characterized in that the checking unit checks whether the result of an irreversible linking by hash encryption of a secret with data introduced by a document producer have been incorporated into the document, in that the checking unit decrypts the secret and additional information that were encrypted by an authentication unit, in that the checking unit irreversibly links the decrypted secret with the data introduced into the document by the document producer, in the same manner as a security module used to produce the forgery-proof document, and in that the checking unit compares the result of the irreversible linking that it has performed itself with the result of an irreversible linking that was performed by the document producer and incorporated into the document, and the output value of a double combination machine is used to form an irreversible hash and that hash value is output from the outlet valve, and the double combination machine comprising a first combination machine and a second combination machine each of which combines a result value on the basis of two input values.

4. The method according to claim 3, characterized in that the comparison determines whether data introduced into the document by the document producer has been forged.

5. The method according to claim 3, characterized in that the first combination machine combines the secret with the data contained in an identification register that unambiguously identifies the security module at a confirmation unit, the result value of the first combination machine is input into an encryption machine which uses the key from a key register to generate an encrypted result value that can only be decrypted by the authentication unit, the result value being output from the security module via a first data output port is transferred to the authentication unit, and wherein data from the document producer itself is introduced into the security module and combined with the second combination machine with the secret that is stored in an intermediate memory unit, the result value of the second combination machine being input into a hash machine which forms the hash value of the input value, and the resultant value being output from the security module via a data output port in order to be incorporated into the document.

6. The method according to claim 1, characterized in that the first combination machine combines the secret with the data contained in an identification register that unambiguously identifies the security module at a conformation unit, the result value of the first combination machine is input into an encryption machine which uses the key from a key register to generate an encrypted result value that can only be decrypted by the authentication unit, the result value being output from the security module via a first data output port is transferred to the authentication unit, and wherein data from the document producer itself is introduced into the security module and combined with the second combination machine with the secret that is stored in an intermediate memory unit, the result value of the second combination machine being input into a hash machine which forms the hash value of the input value, and the resultant value being output from the security module via a data output port in order to be incorporated into the document.

* * * * *